(12) United States Patent
Dinu et al.

(10) Patent No.: US 6,902,871 B2
(45) Date of Patent: Jun. 7, 2005

(54) METHOD FOR MANUFACTURING POLYMER MICROSTRUCTURES AND POLYMER WAVEGUIDES

(75) Inventors: Raluca Dinu, Redmond, WA (US); Jeffrey K. Kressbach, Snohomish, WA (US); Louis J. Bintz, Bothell, WA (US)

(73) Assignee: Lumera Corporation, Bothell, WA (US)

( * ) Notice: Subject to any disclaimer, the term of this patent is extended or adjusted under 35 U.S.C. 154(b) by 92 days.

(21) Appl. No.: 10/264,461

(22) Filed: Oct. 3, 2002

(65) Prior Publication Data

US 2004/0067449 A1 Apr. 8, 2004

(51) Int. Cl.$^7$ ................................. G03F 7/09
(52) U.S. Cl. ...................... 430/321; 430/322; 430/323; 430/325; 385/122
(58) Field of Search ................................ 430/321, 322, 430/323, 325; 385/122

(56) References Cited

U.S. PATENT DOCUMENTS

| | | | |
|---|---|---|---|
| 4,004,044 A | 1/1977 | Franco et al. | |
| 4,362,598 A | 12/1982 | Griffing | |
| 4,532,002 A | 7/1985 | White | |
| 5,007,696 A | 4/1991 | Thackara et al. | 350/96.14 |
| 5,039,186 A | 8/1991 | Man et al. | 385/122 |
| 5,120,339 A | 6/1992 | Markovich et al. | |
| 5,133,037 A | 7/1992 | Yoon et al. | 385/132 |
| 5,198,513 A | 3/1993 | Clement et al. | |
| 5,219,788 A | 6/1993 | Abernathey et al. | |
| 5,223,356 A | 6/1993 | Kumar et al. | |
| 5,340,774 A * | 8/1994 | Yen | 438/301 |
| 5,370,969 A | 12/1994 | Vidusek | |
| 5,433,895 A | 7/1995 | Jeng et al. | |
| 5,480,687 A | 1/1996 | Heming et al. | |
| 5,494,777 A * | 2/1996 | Shiraki et al. | 430/270.1 |
| 5,635,576 A | 6/1997 | Foll et al. | |
| 5,714,304 A | 2/1998 | Gibbons et al. | |
| 5,776,374 A | 7/1998 | Newsham et al. | |
| 5,783,319 A | 7/1998 | Reisfeld et al. | |
| 5,811,507 A | 9/1998 | Chan et al. | |
| 5,861,976 A | 1/1999 | Hoekstra | |
| 6,002,828 A | 12/1999 | Hult et al. | |
| 6,019,906 A | 2/2000 | Jang et al. | |
| 6,031,945 A | 2/2000 | You et al. | |
| 6,126,867 A | 10/2000 | Kanitz et al. | |
| 6,294,573 B1 | 9/2001 | Curtin et al. | |
| 6,303,730 B1 | 10/2001 | Fries et al. | |
| 6,306,563 B1 | 10/2001 | Xu et al. | |
| 6,323,361 B1 | 11/2001 | Wu et al. | |
| 6,335,149 B1 | 1/2002 | Xu et al. | |

(Continued)

FOREIGN PATENT DOCUMENTS

EP          0 617 303          9/1994

OTHER PUBLICATIONS

Bailey et al., "Step and flash imprint lithography: Template surface treatment and defect analysis," *J. Vac. Sci. Technol. B*, 2000, 18(6):3572–3577.

(Continued)

*Primary Examiner*—Amanda Walke
(74) *Attorney, Agent, or Firm*—Fish & Richardson P.C., P.A.

(57) ABSTRACT

A microfabrication process for preparing articles in which a precursor article that includes (a) a substrate, (b) a first polymer layer overlying the substrate, (c) a second polymer layer overlying the first polymer layer, (d) a metal hardmask layer overlying the second polymer layer, and (e) a photodefinable layer overlying the metal hardmask layer is subjected to photolithographic imaging, developing, and plasma etching steps to form an article that includes the substrate and portions of the first polymer layer arranged in a pattern corresponding to the pattern of the photomask used for photolithographic imaging.

18 Claims, 6 Drawing Sheets

U.S. PATENT DOCUMENTS

| | | | |
|---|---|---|---|
| 6,419,989 B1 | | 7/2002 | Betz et al. |
| 6,458,516 B1 | * | 10/2002 | Ye et al. .................... 430/317 |
| 6,734,436 B2 | * | 5/2004 | Faris et al. ............. 250/432 R |
| 2002/0039464 A1 | | 4/2002 | Yoshimura et al. |
| 2002/0125443 A1 | | 9/2002 | Sandstrom |

OTHER PUBLICATIONS

Chen et al., "Thermosetting Polyurethanes with Stable and Large Second–Order Optical Nonlinearity," *Macromolecules*, 1992, 25:4032–4035.

Grote et al., "Effect of conductivity and dielectric constant on the modulation voltage for optoelectronic devices based on nonlinear optical polymers," *Opt. Eng.*, 2001, 40(11):2464–2473.

Ma et al., "A Novel Class of High–Performance Perfluorocyclobutane–Containing Polymers for Second–Order Nonlinear Optics," *Chem. Mater.*, 2000, 12:1187–1189.

Ma et al., "Highly Efficient and Thermally Stable Nonlinear Optical Dendrimer for Electrooptics," *J. Am. Chem. Soc.*, 2001, 123:986–987.

Mao et al., "Progress toward Device–Quality Second–Order Nonlinear Optical Materials. 1. Influence of Composition and Processing Conditions on Nonlinearity, Temporal Stability, and Optical Loss," *Chem. Mater.*, 1998, 10:146–155.

Oh et al., "Electro–optic polymer modulators for 1.55 $\mu$m wavelength using phenyltetraene bridged chromophore in polycarbonate," *Appl. Phys. Lett.*, 2000, 76(24):3525–3527.

Resnick et al., "Release Layers for Contact and Imprint Lithography," *Semicon. Int.*, Jun. 2002, online version, 7 pgs.

* cited by examiner

"rib"

"quasi-rib"

"trench"

Figure 6
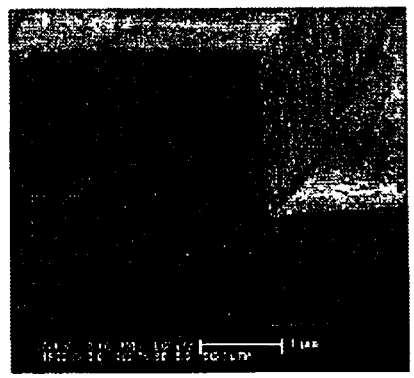
Fig. 6A
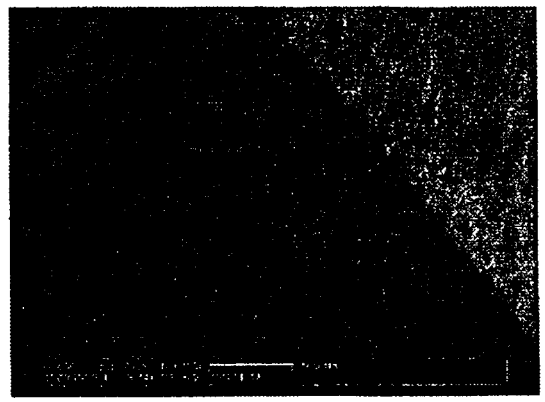
Fig. 6B
Fig. 6C

METHOD FOR MANUFACTURING POLYMER MICROSTRUCTURES AND POLYMER WAVEGUIDES

BACKGROUND OF THE INVENTION

All patents, patent applications, and publications cited within this application are incorporated herein by reference to the same extent as if each individual patent, patent application or publication was specifically and individually incorporated by reference.

The invention relates generally to the use of photolithographic and dry etching techniques to provide microstructures in polymers. The invention also relates to methods for fabricating optical polymer waveguide devices.

The use of photolithographic and dry etching techniques to define microstructures in inorganic and organic materials is well known to those skilled in the arts of microelectronics, semi-conductors, and photonics. Typically, referring to FIG. 1, a microstructure is produced in a material by a process of 1) exposing a photoresist composition (10), which can be any one of commercially available photoresists such as those containing novolak resins, on a material (12) disposed on a substrate (14) to radiation (16) through a photomask (18) that shields part of the photoresist from the radiation, whereby the parts of the composition that are exposed to radiation (20) change chemically relative to the parts that are shielded from the radiation (22); 2) removing one of the parts of the photoresist layer (also referred to as "developing"), thereby uncovering portions of the material (12), and forming the pattern of the photomask on the material (12); 3) treating the uncovered portions of material (12) and remaining photoresist portions (22) with a reactive ion plasma (24) to remove portions of material (12), thereby transferring the pattern of the photomask to the substrate (14); 5) removing the remaining photoresist (22) (also referred to as "stripping") to leave behind the material (12), thereby transferring the pattern of the photomask to substrate (14).

Making microstructures is a crucial step in fabricating optical polymer waveguides that can be used in optical communications systems and methods. An optical polymer waveguide is comprised of at least one core region (also referred to as the waveguiding core or core) that is surrounded by a cladding region (also referred to as cladding or clads). Most of the light that travels through the waveguide resides in the core while a smaller portion resides in the cladding. Photolithography and dry etching have been used to make optical polymer waveguides, for example see U.S. Pat. Nos. 5,263,111; 5,381,506; 6,061,487; and 6,306,563. More specifically, photolithography and dry etching are used to make, referring to FIG. 2, rib core (28), quasi-rib core (30), or trench core (32) either on or in a clad (34). Referring to FIG. 3, a typical process of making a waveguide core comprises: 1) providing at least a four layer structure including a photoresist (36), core polymer (38), clad polymer (40), and substrate (42); 2) exposing the photoresist to radiation (44) through a photomask (46); 3) developing the waveguide pattern in the photoresist (36) on the core polymer (38); 4) dry etching the core polymer (38) and photoresist (36) with a reactive ion plasma (39) to provide a waveguide core (38) covered with the remaining photoresist (36); and 5) removing the remaining photoresist to provide the waveguide core (38) on the clad polymer (40). Since the photoresist is dry etched during the etching of the core polymer, the photoresist layer typically is thicker than the final waveguide core thickness.

In a typical waveguide core making process, problems may be encountered in the photolithography step when the photoresist has a thickness greater than about 1 $\mu$m. Longer exposure times, normally used in thicker photoresist, can amplify light scattering, diffraction and back reflection phenomena. One solution of this problem can be the use of anti-reflective coatings; however, anti-reflective coatings require curing temperatures in excess of 180° C., which will cause loss of electro-optic activity in poled polymers. Thus, during a process of making an electro-optically active polymer waveguide core, it is desirable to use a thin photoresist layer in order to minimize problems from long exposure times while avoiding the use of anti-reflective coatings that would cause loss of electro-optic activity.

Using a thin layer of photoresist to make thick structures can be accomplished using a hardmask that functions as a dry etch stop, which is known in the field of microelectronics, for example see U.S. Pat. Nos. 5,219,788; 5,370,969; and 6,019,906. A hardmask is referred to sometimes as a "hardmask layer," "barrier layer," "etch stop," or "interfacial film." The hardmask acts as an etch stop during the polymer dry etching step. A process for making microstructures using a hardmask is illustrated in FIG. 4. First, a four layer structure is provided that comprises a thin layer of photoresist (48), a polymer (50) to be patterned on a substrate (52), and a hardmask layer (54) between the polymer and photoresist. The photoresist is exposed to radiation (56) through a photomask (58) and developed to give the pattern of remaining photoresist (48) on the hardmask layer (54). The hardmask layer (54) is then dry etched with a reactive ion plasma (59) to remove portions of the hardmask layer (54). The polymer and photoresist are then selectively dry etched with a second reactive ion plasma (60) that does not etch the hardmask layer (54) to form a pattern consisting of the remaining hardmask layer (54) and the remaining polymer layer (50) on the substrate (52). If desired, the hardmask layer may be removed with either dry or wet etching. Since the hardmask acts as a dry etch stop during etching of the polymer, the photoresist layer does not have to be thicker than the polymer layer, and can be around or less than 1 $\mu$m thick.

Current microelectronics hardmasking techniques cannot be applied to fabricating electro-optically active waveguides since the hardmask is deposited by chemical vapor deposition (CVD). CVD requires temperatures typically in excess of 200° C., which can cause loss of electro-optic activity in most poled second-order nonlinear optical (NLO) polymers due to either chromophore decomposition or thermal randomization of the aligned chromophores. The development and uses of second-order NLO chromophores, including polymer matrix development, waveguide fabrication, and optical device fabrication are described in U.S. Pat. Nos. 5,272,218; 5,276,745; 5,286,872; 5,288,816; 5,290,485; 5,290,630; 5,290,824; 5,291,574; 5,298,588; 5,310,918; 5,312,565; 5,322,986; 5,326,661; 5,334,333; 5,338,481; 5,352,566; 5,354,511; 5,359,072; 5,360,582; 5,371,173; 5,371,817; 5,374,734; 5,381,507; 5,383,050; 5,384,378; 5,384,883; 5,387,629; 5,395,556; 5,397,508; 5,397,642; 5,399,664; 5,403,936; 5,405,926; 5,406,406; 5,408,009; 5,410,630; 5,414,791; 5,418,871; 5,420,172; 5,443,895; 5,434,699; 5,442,089; 5,443,758; 5,445,854; 5,447,662; 5,460,907; 5,465,310; 5,466,397; 5,467,421; 5,483,005; 5,484,550; 5,484,821; 5,500,156; 5,501,821; 5,507,974; 5,514,799; 5,514,807; 5,517,350; 5,520,968; 5,521,277; 5,526,450; 5,532,320; 5,534,201; 5,534,613; 5,535,048; 5,536,866; 5,547,705; 5,547,763; 5,557,699; 5,561,733; 5,578,251; 5,588,083; 5,594,075; 5,604,038; 5,604,292;

5,605,726; 5,612,387; 5,622,654; 5,633,337; 5,637,717; 5,649,045; 5,663,308; 5,670,090; 5,670,091; 5,670,603; 5,676,884; 5,679,763; 5,688,906; 5,693,744; 5,707,544; 5,714,304; 5,718,845; 5,726,317; 5,729,641; 5,736,592; 5,738,806; 5,741,442; 5,745,613; 5,746,949; 5,759,447; 5,764,820; 5,770,121; 5,76,374; 5,776,375; 5,777,089; 5,783,306; 5,783,649; 5,800,733; 5,804,101; 5,807,974; 5,811,507; 5,830,988; 5,831,259; 5,834,100; 5,834,575; 5,837,783; 5,844,052; 5,847,032; 5,851,424; 5,851,427; 5,856,384; 5,861,976; 5,862,276; 5,872,882; 5,881,083; 5,882,785; 5,883,259; 5,889,131; 5,892,857; 5,901,259; 5,903,330; 5,908,916; 5,930,017; 5,930,412; 5,935,491; 5,937,115; 5,937,341; 5,940,417; 5,943,154; 5,943,464; 5,948,322; 5,948,915; 5,949,943; 5,953,469; 5,959,159; 5,959,756; 5,962,658; 5,963,683; 5,966,233; 5,970,185; 5,970,186; 5,982,958; 5,982,961; 5,985,084; 5,987,202; 5,993,700; 6,001,958; 6,005,058; 6,005,707; 6,013,748; 6,017,470; 6,020,457; 6,022,671; 6,025,453; 6,026,205; 6,031,945; 6,033,773; 6,033,774; 6,037,105; 6,041,157; 6,045,888; 6,047,095; 6,048,928; 6,051,722; 6,061,481; 6,061,487; 6,067,186; 6,072,920; 6,081,632; 6,081,634; 6,081,794; 6,086,794; 6,090,322; 6,091,879; and 6,210,867.

Another reason present microelectronics hardmasking techniques cannot be applied to fabricating either active or passive waveguides is that the hardmask requires removal by either wet etching or dry etching. Wet or dry etching of a hardmask deposited directly on a waveguide core material can cause surface roughness on the waveguide, which can lead to unacceptably high optical loss.

SUMMARY OF THE INVENTION

In general, the invention features, in one aspect, a microfabrication process for preparing articles (e.g., optical articles such as modulators, couplers, switches, and the like) in which a precursor article that includes (a) a substrate, (b) a first polymer layer overlying the substrate, (c) a second polymer layer overlying the first polymer layer, (d) a metal hardmask layer overlying the second polymer layer, and (e) a photodefinable layer overlying the metal hardmask layer is subjected to photolithographic imaging, developing, and plasma etching steps to form an article that includes the substrate and portions of the first polymer layer arranged in a pattern corresponding to the pattern of the photomask used for photolithographic imaging. Preferably, the metal hardmask is sputter-deposited onto the second polymer layer, thereby avoiding the high temperatures associated with, e.g., CVD processes.

The second polymer acts as a protective layer, thereby enabling the metal hardmask to be removed during processing without damaging the microstructure formed within the first polymer layer. In addition, it is possible to use relatively thin (e.g., less than about 1.5 micron) thick photodefinable layers. These advantages are particularly useful for preparing articles such as optical waveguides, where the first polymer layer forms the waveguide core and is an electro-optically active, crosslinkable polymer having a refractive index higher than that of the substrate that forms the cladding.

As used herein, the term "layer" includes both continuous and discontinous layers. In addition, the term "overlying" includes both layers that directly contact each other and layers that are separated from each other by, e.g., additional layers.

Other features and advantages of the invention will be apparent from the following description of preferred embodiments thereof, and from the claims.

BRIEF DESCRIPTION OF THE DRAWINGS

FIG. 6 shows features of the Mach-Zehnder modulator patterns in an electro-optically active polymer produced according to the process shown in FIG. 5.

DETAILED DESCRIPTION

Figure 1:
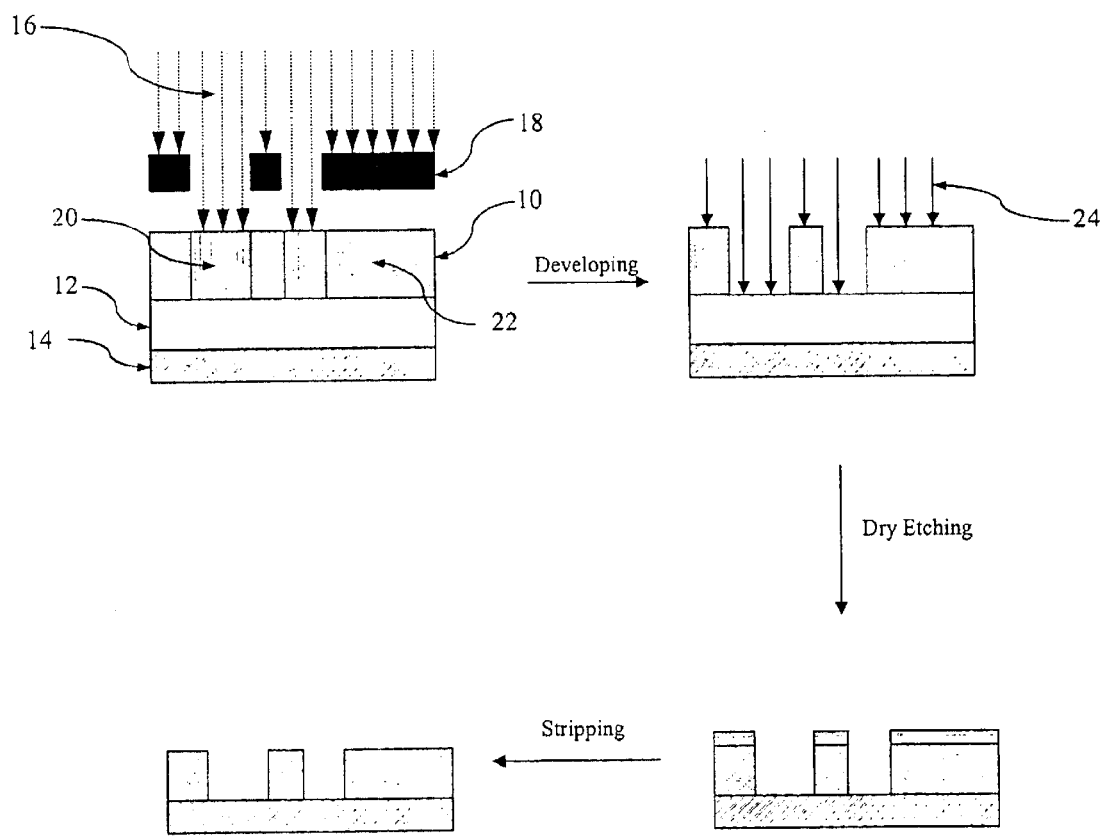
FIG. 1 is a illustration of a prior art photolithography process in a cross-sectional view.
Figure 2:
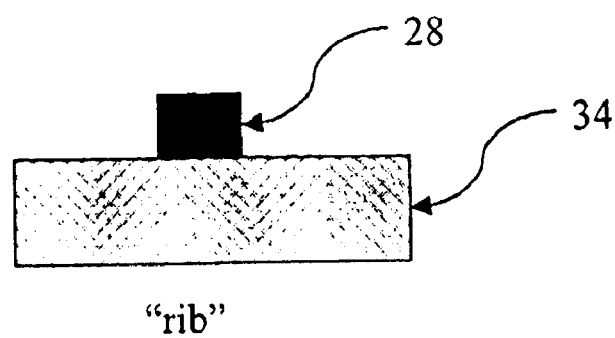
FIG. 2 is an illustration of a prior art rib, quasi-rib, and trench waveguide in a cross-sectional view.
Figure 2:
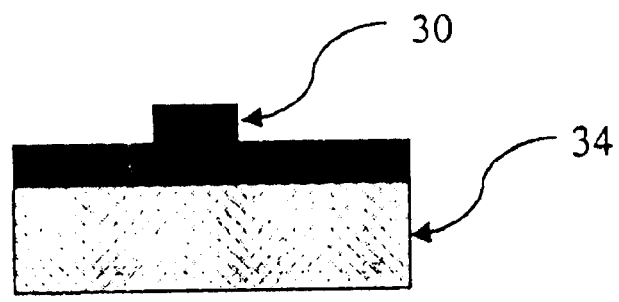
Figure 2:
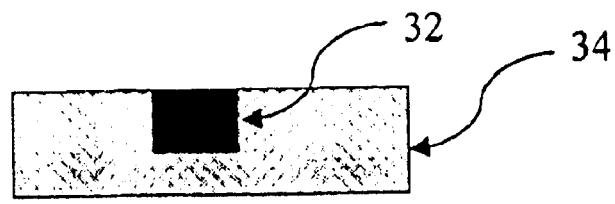
Figure 3:
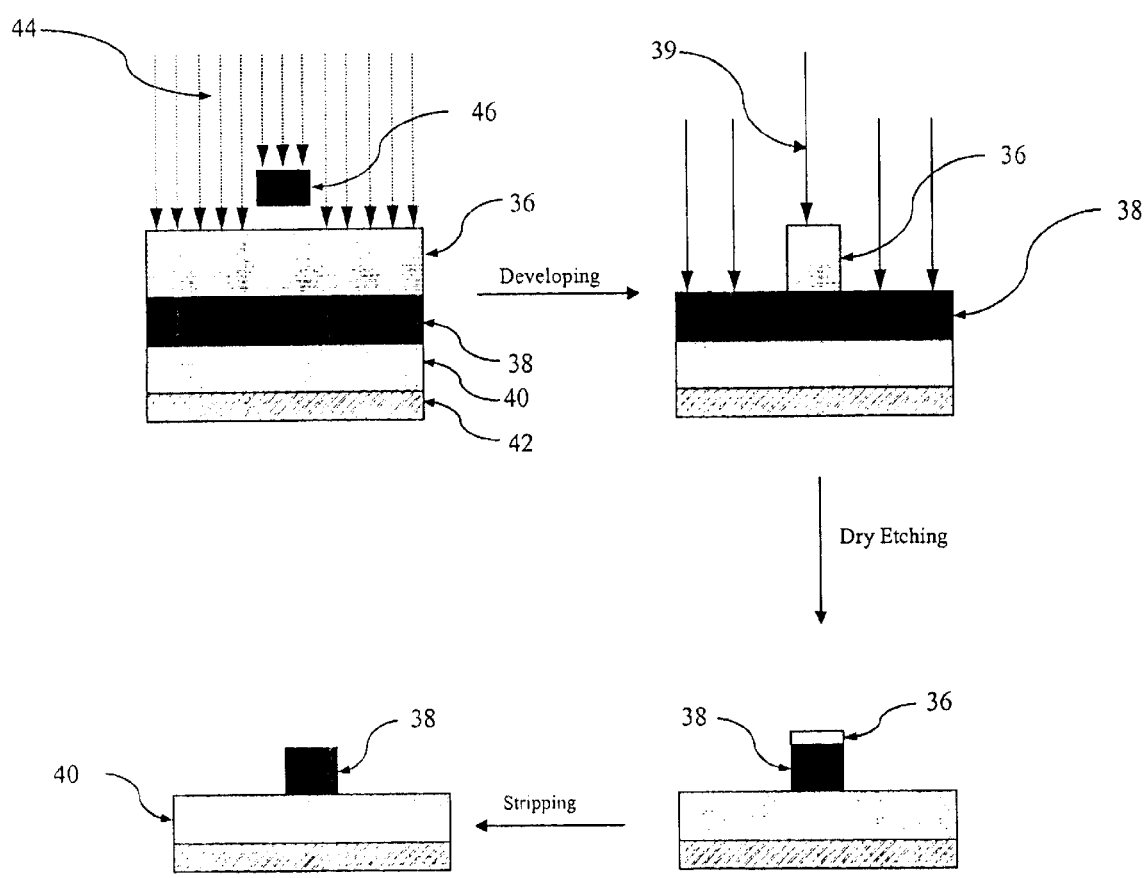
FIG. 3 is an illustration of a prior art photolithography and dry etching fabrication process for a polymer waveguide in a cross-sectional view.
Figure 4:
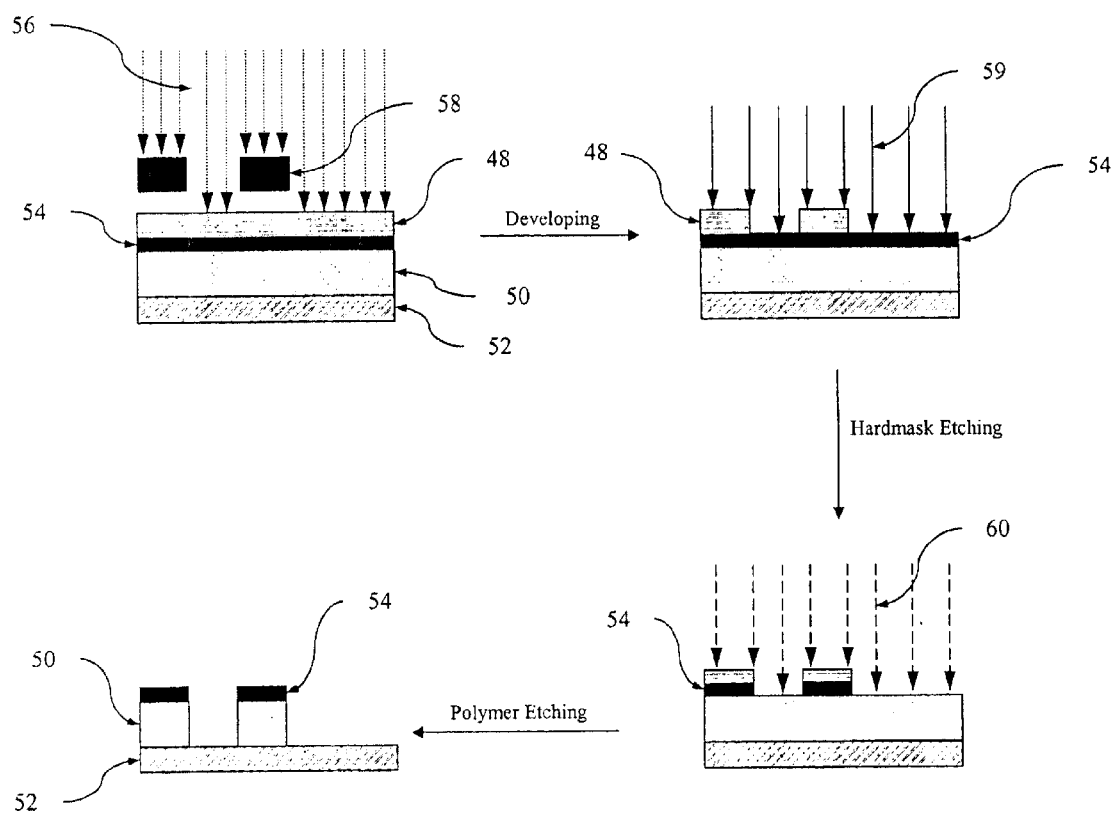
FIG. 4 is an illustration of a prior art photolithography and dry etching process using a hardmask in a cross-sectional view.
Figure 5:
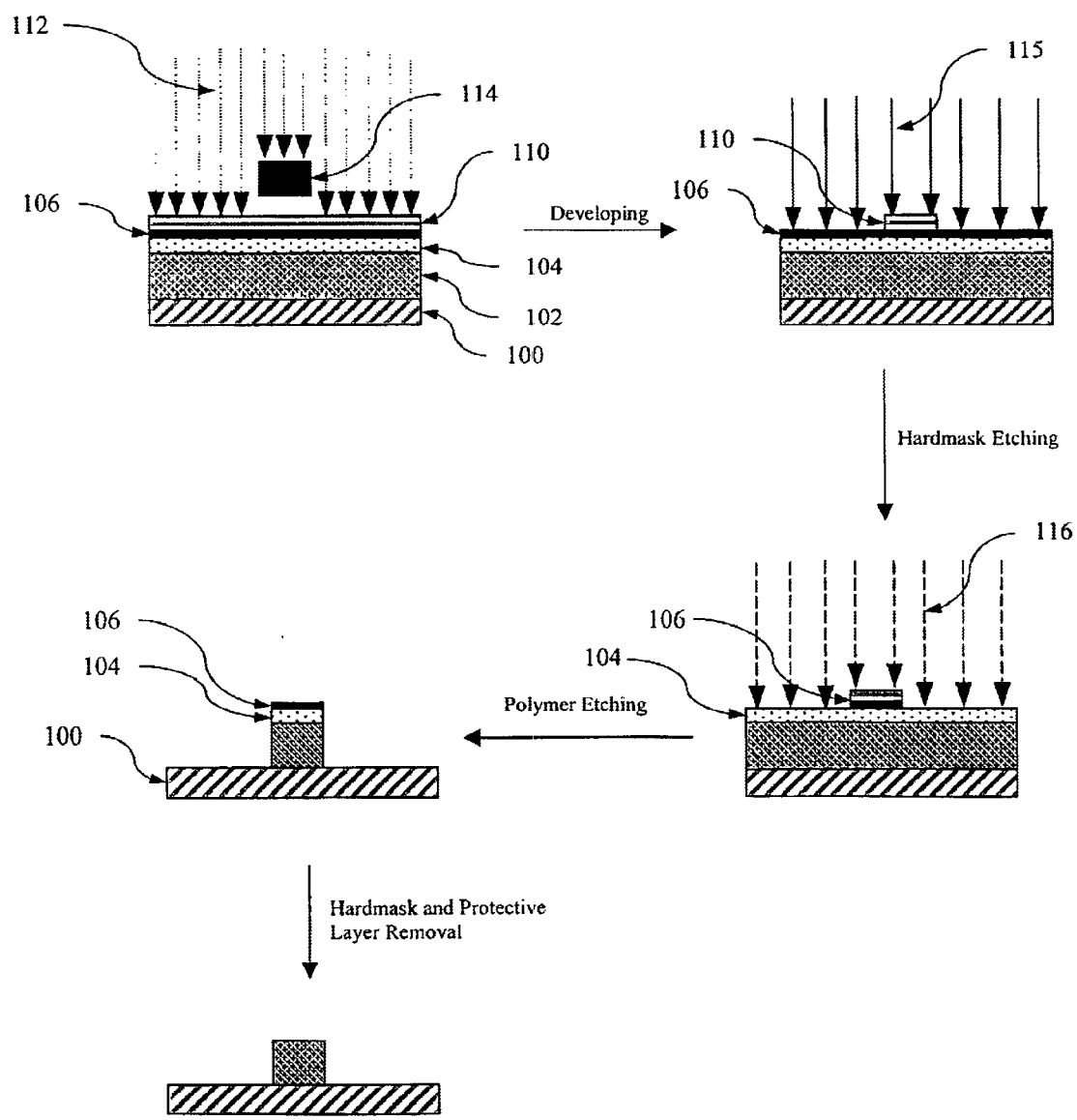
FIG. 5 is an illustration of a preferred embodiment of a photolithography and dry etching process according to the present invention in a cross-sectional view.

Referring to FIG. 5, there is shown a microfabrication process that includes: 1) providing a precursor article comprising a substrate (100), a first polymer layer (102), a second polymer layer (104, also referred to as the protective polymer layer) with a thickness of less than about 1.5 $\mu$m on top of the first polymer layer, a metal hardmask layer (106) with a thickness no greater than about 0.035 $\mu$m, and preferably about 0.025 $\mu$m, on top of the second polymer layer, and a photodefinable layer (110) that has a thickness of no greater than about 1.5 $\mu$m on top of the metal hardmask layer; 2) exposing the photodefinable layer to radiation (112) through a photomask (114); 3) developing the photodefinable layer to provide the pattern of the photomask on the metal hardmask layer (106); 4) etching the metal hardmask layer (106) with a first plasma (115) that does not etch through the remaining photodefinable layer (110), whereby the pattern is transferred to the second polymer layer (104); 5) etching the remaining photodefinable layer, the second polymer layer, and first polymer layer with a second plasma (116) that does not etch the remaining metal hardmask layer (106), whereby the pattern is transferred to the substrate (100); and 6) removing the remaining metal hardmask layer (106) and remaining second polymer layer (104). Preferably, the thickness of the second polymer layer is about 1 $\mu$m and the thickness of the photodefinable layer is about 1 $\mu$m.

The precursor article can be provided by spin depositing the first polymer layer (102) on the substrate (100), spin depositing the second polymer layer (104) on the first polymer layer (102), sputtering the metal hardmask layer (106) onto the second polymer layer, and spin depositing the photodefinable layer (110) onto the metal hardmask layer. The substrate (100) can also be spin-deposited in cases where the substrate is a polymer. Any one of the polymer layers may also be deposited by other methods known to those skilled in the art such as dip coating, printing, and brushing.

In some embodiments, e.g., where the process is used to prepare optical waveguides, the substrate (100) has a refractive index that is lower than the refractive index of the first polymer layer (102).

Examples of suitable materials for the substrate (100) include organic polymers (preferably crosslinkable organic polymers), sol-gels, and organically modified sol-gels (ORMOSIL) organically modified silicate. Crosslinkable organic polymers, sol-gels, and ORMOSILs organically modified silicate are known to those skilled in the art, for example see U.S. Pat. No. 6,306,563; 6,323,361; 6,126,867; 6,002,828; 5,783,319; 6,419,989; 5,120,339; 6,303,730; and 5,480,687.

Examples of suitable metals for the metal hardmask (106) include any metal that can be etched with a reactive ion plasma that does not etch through the photodefinable layer (110) and can be deposited on the second polymer layer (104) by means that do not affect the first polymer layer (102) adversely. For example, when the first polymer layer (102) is an electro-optically active polymer, preferably the metal hardmask will be comprised of a metal that can be deposited at a temperature of no greater than about 100° C. (e.g., by sputtering). Preferably, the metals include transition metals, Group I–III metals, and metal alloys. The first polymer layer (102) preferably includes an electro-optically active polymer. Preferably, the electro-optically active polymer is crosslinkable. Crosslinkable electro-optically active polymers are known to those skilled in the art, for example see U.S. Pat. Nos. 5,776,374; 5,714,304; 5,223,356; 5,433,895; 6,294,573; 6,126,867; 5,811,507; 5,635,576; *Chem. Mater.* 2000, 12, 1187; *J. Am Chem. Soc.* 2001, 123, 986; *Macromolecules* 1992, 25, 4032; and *Chem. Mater.* 1998, 10, 146.

In one embodiment, the photodefinable layer is a novolak resin. In another embodiment, the photodefinable layer is a positive tone photoresist or a negative tone photoresist. Positive and negative tone photoresists are known to those skilled in the art, for example see U.S. Pat. Nos. 5,296,332; 5,340,697; 5,827,634; and 5,225,316.

Photomasks having various patterns may be used. In one preferred embodiment, the pattern of the photomask defines a Mach-Zehnder modulator or directional coupler.

The first plasma may include sulfur hexafluoride. The second plasma may include oxygen.

In one preferred embodiment, the substrate is an organically modified sol-gel, the first polymer layer is electro-optically active and crosslinkable and has a refractive index that is higher than the refractive index of the substrate, the second polymer layer is a novolak resin, the metal hardmask is titanium, the photodefinable layer is a novolak resin, the pattern of the photomask defines a Mach-Zehnder modulator or directional coupler, the first plasma comprises sulfur hexafluoride, and the second plasma comprises oxygen.

In another preferred embodiment, the process includes using a metal hardmask to plasma etch at least one pattern of an electro-optically active polymer that is on top of a first cladding layer where the first cladding layer has an index of refraction that is lower than the index of refraction of the electro-optically active polymer and providing a second cladding layer on top of the etched electro-optically active polymer and first cladding layer where the second polymer cladding has a index of refraction lower than the index of refraction of the electro-optically active polymer.

EXAMPLES

This example illustrates the preparation of a polymer waveguide using a precursor waveguide in which the substrate (170) is an ORMOSIL organically modified silicate, the first polymer layer (175) is an electro-optically active crosslinkable polymer, the second polymer layer (180) is Megaposit SPR 220-1.2 photo resist from Shipley, the sputtered metal hardmask (185) is titanium, and the photodefinable layer (190) is Megaposit SPR 220-1.2 photo resist from Shipley.

The waveguide precursor was prepared by: 1) filtering a 38% (by weight) solution of ORMOSIL in cyclohexanone through a 0.2 µm Nylon filter, spin depositing the filtered solution on a 6-inch wafer at 500 rpm for 5 seconds and 2900 rpm for 30 seconds, and heating of the wafer under 50 Torr of vacuum at 100° C. for 60 min (heating rate of 0.5° C./min), 150° C. for 60 min (heating rate of 3° C./min), and 190° C. for 90 min (heating rate of 5° C./min), and cooling the wafer to ambient temperature at a cooling rate of 0.5° C./min to obtain the substrate (170); 2) filtering a 1% (by weight) solution of poly(N-(2-aminoethyl)-3-aminopropylmethyl-dimethoxysilane) in isopropyl alcohol through a 0.2 µm Nylon filter, spin depositing the filtered solution on the substrate at 500 rpm for 5 sec and 3000 rpm for 30 sec, and heating on a hot plate at 100° C. for 5 min to obtain an adhesion promoter for the substrate (170) and first polymer layer (175); 3) filtering a 30% (by total solids weight) solution of chromophore and crosslinkable polymer (the chromophore concentration with respect to the crosslinkable polymer is 25% by weight) in cyclopentanone through a 0.2 µm Nylon filter, spin depositing the filtered solution at 300 rpm for 2 sec then 500 rpm for 5 sec, then 1000 rpm for 20 sec, heating at 80° C. on a hot plate for 10 min, heating at 70° C. at 1 mTorr for 480 min, applying a Corona voltage of 4.5 kV to the wafer while heating to 180° C. over 10 min, holding at 4.5 kV at 180° C. for 10 min, increasing the Corona voltage to 7.5 kV and holding at 180° C. for 10 min, and cooling to ambient temperature over 25 min to obtain the first polymer layer (175) that is electro-optically active; 4) spin depositing Megaposit SPR 220-1.2 photo resist from Shipley at 100 rpm for 5 seconds then 500 rpm for 5 sec then 3000 rpm for 30 sec, heating at 50° C. at less than 25 mTorr for 3 h, and allowing to stand in air for at least 20 min to obtain the second polymer layer (180); 5) loading the wafer into a sputtering chamber and lowering the pressure to less than $2 \times 10^{-6}$ Torr, holding at 7.5 mTorr during a pre-sputtering time of 360 sec with a power of 70 W, a voltage of 267 V, and a current of 250 mA, and sputtering titanium metal on the wafer for 100 sec to obtain the sputtered metal hardmask layer (185); and 6) spin depositing Megaposit SPR 220-1.2 photo resist from Shipley at 100 rpm for 5 seconds then 500 rpm for 5 sec then 3000 rpm for 30 sec, heating at 50° C. at less than 25 mTorr for 4 h, and allowing to stand in air for at least 20 min to obtain the photodefinable layer (190). The thickness of the layers obtained above were 1.9 µm, 3.0 µm, 1.0 µm, 0.025 µm, and 1.0 µm for the substrate (170), first polymer layer (175), second polymer layer (180), sputtered metal hardmask (185), and photodefinable layer (190), respectively.

The photodefinable layer was exposed to 365 nm light with an intensity of 32 mW/cm$^2$ through a photomask for 3 sec on a Karl Suss MA-6 mask aligner. The exposed photodefinable layer was allowed to stand at ambient temperature for at least 20 min after exposure. The photomask was in hard contact with the photodefinable layer, and the pattern of the photomask comprised Mach-Zehnder modulators.

The photodefinable layer was developed with Megaposit MF-24A developer from Shipley for 45 sec, spin-rinsed at 300 rpm for 30 sec with deionized water, and dried at 2000 rpm for 30 sec under N$_2$.

Etching the sputtered titanium hardmask layer was accomplished with SF$_6$/Ne plasma in a TekVac DRIE-1200-LL-ICP. The working pressure of the etching chamber was 20 mTorr and the flow rates for SF$_6$ and Ne were 12.5 sccm and 4 sccm, respectively. The forward power of the inductively coupled plasma (ICP) unit was 500 W (29 W reflected) with Ct and Cl capacitance of 627 nF and 375 nF, respectively. The reactive ion etching unit had a forward power of 57 W (1 W reflected) at a bias of 170 V with Ct and Cl capacitance of 121 nF and 815 nF, respectively. The wafer was etched for 4.5 min.

Etching the first and second polymer layers was accomplished with oxygen plasma. The working pressure of the etching chamber is 5.5 mTorr and the flow rate oxygen was 36 seem. The forward power of the inductively coupled plasma (ICP) unit was 500 W (23 W reflected) with Ct and Cl capacitance of 629 nF and 357 nF, respectively. The reactive ion etching unit had a forward power of 33 W (1 W reflected) at a bias of 170 V with Ct and Cl capacitance of 121 nF and 815 nF, respectively. The wafer was etched for 70 min.

The remaining sputtered titanium hardmask and remaining second polymer layer were removed by etching the sputtered titanium hardmask layer with the $SF_6$/Ne plasma for 3.5 min and stripping the second polymer layer with RS 112 stripper from Cyantek (4 min total), followed by isopropyl alcohol (2 min total) and deionized water rinsing.

Features of the Mach-Zehnder modulator patterns of electro-optic polymer obtained on the organically modified solgel by the process above are shown in FIG. 6, where FIG. 6A is an SEM image of the vertical walls of the waveguide, FIG. 6B is an SEM of the sidewalls showing less than 30 nm roughness, and FIG. 6C is a 100× microscope image of the Mach-Zehnder splitter.

Other embodiments are within the following claims.

What is claimed is:

1. A microfabrication process comprising:
   (A) providing a precursor article comprising:
      (a) a substrate;
      (b) a first polymer layer overlying the substrate;
      (c) a second polymer layer overlying the first polymer layer;
      (d) a metal hardmask layer overlying the second polymer layer; and
      (e) a photodefinable layer overlying the metal hardmask layer;
   (B) exposing the photodefinable layer to radiation through a photomask having a defined pattern;
   (C) developing the photodefinable layer following exposure to remove portions of the photodefinable layer defined by the pattern and uncover corresponding portions of the underlying metal hardmask layer;
   (D) etching the uncovered portions of the metal hardmask layer with a first plasma to uncover corresponding portions of the underlying second polymer layer without etching through the remaining photodefinable layer;
   (E) etching (i) the remaining portions of the photodefinable layer, (ii) the uncovered portions of the second polymer layer, and (iii) underlying portions of the first polymer layer corresponding to the uncovered portions of the second polymer layer with a second plasma that does not etch the remaining portions of the metal hardmask layer to uncover corresponding portions of the substrate; and
   (F) removing the remaining portions of the metal hardmask layer and remaining portions of the second polymer layer to yield an article comprising the substrate and portions of the first polymer layer overlying the substrate arranged in a pattern that corresponds to the pattern of the photomask.

2. The process of claim 1, wherein the substrate has a refractive index that is lower than the refractive index of the first polymer layer.

3. The process of claim 2, wherein the substrate is selected from the group consisting of an organic polymer, a crosslinkable organic polymer, a sol-gel, and an organically modified sol-gel.

4. The process of claim 1, wherein the metal hardmask layer comprises titanium.

5. The process of claim 1, wherein the first polymer layer comprises an electro-optically active polymer.

6. The process of claim 5, wherein the electro-optically active polymer is crosslinkable.

7. The process of claim 1, wherein the photodefinable layer comprises a novolak resin.

8. The process of claim 1, wherein the photodefinable layer comprises a positive tone photoresist.

9. The process of claim 1, wherein the photodefinable layer comprises a negative tone photoresist.

10. The process of claim 1, wherein the metal hardmask layer has a thickness no greater than about 0.035 $\mu$m.

11. The process of claim 1, wherein the second polymer layer has a thickness no greater than about 1.5 $\mu$m.

12. The process of claim 1, wherein the photodefinable layer has a thickness no greater than about 1.5 $\mu$m.

13. The process of claim 1, wherein the pattern of the photomask defines a Mach-Zehnder modulator or directional coupler.

14. The process of claim 1, wherein the first plasma comprises sulfur hexafluoride.

15. The process of claim 1, wherein the second plasma comprises oxygen.

16. The process of claim 1, wherein:
   the substrate comprises an organically modified sol-gel;
   the first polymer layer comprises an electro-optically active, crosslinkable polymer, and has a
   refractive index that is higher than the refractive index of the substrate;
   the second polymer layer comprises a novolak resin;
   the metal hardmask layer comprises titanium;
   the photodefinable layer comprises a novolak resin;
   the pattern of the photomask defines a Mach-Zehnder modulator or directional coupler;
   the first plasma comprises sulfur hexafluoride; and
   the second plasma comprises oxygen.

17. A microfabrication process for preparing a polymer optical waveguide comprising:
   (A) providing an optical waveguide precursor comprising:
      (a) a polymer substrate having a refractive index;
      (b) an electro-optically active polymer layer overlying the substrate having a refractive index that is higher than the refractive index of the substrate;
      (c) a second polymer layer overlying the electro-optically active polymer layer;
      (d) a metal hardmask layer having a thickness no greater than about 0.035 $\mu$m overlying the second polymer layer; and
      (e) a photodefinable layer overlying the metal hardmask layer;
   (B) exposing the photodefinable layer to radiation through a photomask having a defined pattern;
   (C) developing the photodefinable layer following exposure to remove portions of the photodefinable layer defined by the pattern and uncover corresponding portions of the underlying metal hardmask layer;
   (D) etching the uncovered portions of the metal hardmask layer with a first plasma to uncover corresponding portions of the underlying second polymer layer without etching through the remaining photodefinable layer;

(E) etching (i) the remaining portions of the photodefinable layer, (ii) the uncovered portions of the second polymer layer, and (iii) underlying portions of the electro-optically active polymer layer corresponding to the uncovered portions of the second polymer layer with a second plasma that does not etch the remaining portions of the metal hardmask layer to uncover corresponding portions of the polymer substrate; and (F) removing the remaining portions of the metal hardmask layer and remaining portions of the second polymer layer to yield a polymer optical waveguide comprising the polymer substrate and portions of the electro-optically active polymer layer overlying the substrate arranged in a pattern that corresponds to the pattern of the photomask.

18. An optical waveguide precursor comprising:

(a) a polymer substrate having a refractive index;

(b) an electro-optically active polymer layer overlying the substrate having a refractive index that is higher than the refractive index of the substrate;

(c) a second polymer layer overlying the electro-optically active polymer layer;

(d) a metal hardmask layer having a thickness no greater than about 0.035 $\mu$m overlying the second polymer layer; and (e) a photodefinable layer overlying the metal hardmask.

* * * * *